June 6, 1961   E. E. THOMPSON   2,987,665
REGULATED D.C.-D.C. CONVERTERS
Filed May 18, 1959   2 Sheets-Sheet 1
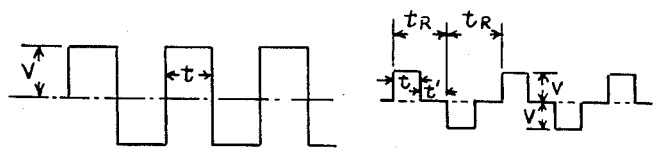
Fig. 1   Fig. 2
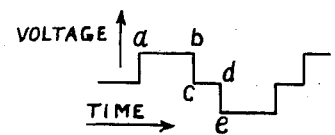
Fig. 3
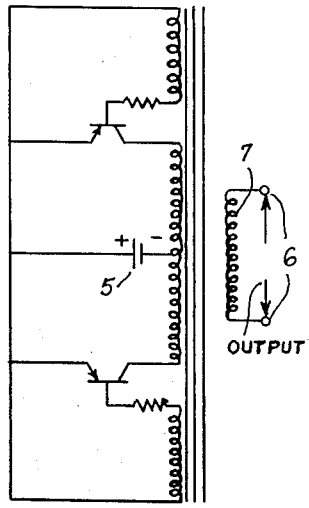
Fig. 4
Fig. 7
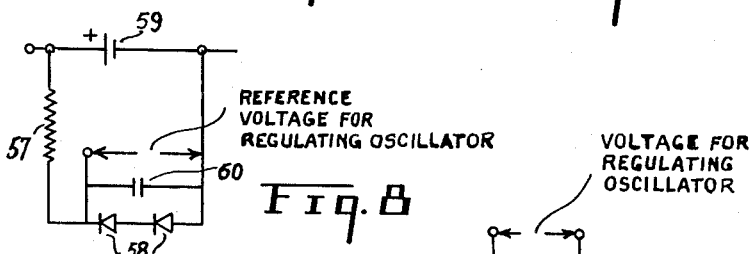
Fig. 8
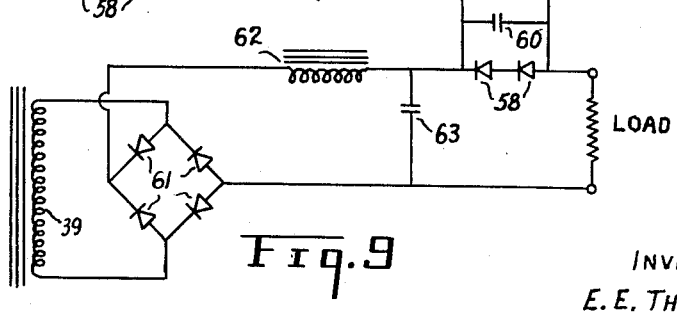
Fig. 9
INVENTOR
E. E. THOMPSON
By Hetherstonhaugh & Co.
Attorneys

INVENTOR
E. E. THOMPSON

United States Patent Office 2,987,665
Patented June 6, 1961

2,987,665
REGULATED D.C.-D.C. CONVERTERS
Edward E. Thompson, Montreal, Quebec, Canada, assignor to Canadair Limited, Montreal, Quebec, Canada
Filed May 18, 1959, Ser. No. 813,791
12 Claims. (Cl. 321—16)

This invention relates to power supply systems and particularly to D.C.-D.C. converters employing a transistor magnetic oscillator which is required to have a regulated output voltage.

It is well known that transistor-magnetic oscillators, of the type which we are here concerned with, will produce a square wave output. In normal D.C.-D.C. converters this square output wave is then rectified and filtered to give the desired D.C. output voltage and, in the absence of any attempt at regulation, the output voltage will vary in direct ratio with the supply voltage. With D.C.-D.C. converters of this type regulation is normally achieved by either absorbing the excess voltage of the input above a certain reference value or by employing a reference element in the output circuit in conjunction with an additional series load. These methods are inefficient as they waste all the output from the D.C. source above the reference value.

The present invention consists essentially in the method of regulating D.C.-D.C. converters which will operate when the power oscillator is of the type which relies on the saturation of a core for termination of one half of the cycle and commencement of the other half cycle and in which power is fed into the output circuit during the period when the core is being saturated.

It is the primary object of the present invention to achieve regulation of the output voltage of D.C.-D.C. converters without any direct wastage of power.

A further object of the invention is to achieve regulated output in D.C.-D.C. converters by using a regulating oscillator to control the base drive of the transistors of the main or power oscillator.

A further object of the invention is to provide output voltages in D.C.-D.C. converters which will be regulated both in regard to line and load variations to a high degree.

A further object of the invention is to provide output voltages in D.C.-D.C. converters which are made insensitive to variations in ambient temperatures.

These and other objects of the invention will be apparent from the following specification and the accompanying drawings, in which:

FIGURE 1 is the type of square wave produced on the output coil of a transistor-magnetic oscillator.

FIGURE 2 is a square wave form obtained by the introduction of a quiescent period to the wave form shown in FIGURE 1.

FIGURE 3 is a square wave form obtained by coupling a regulating oscillator to the transistor-magnetic oscillator wave form of FIGURE 1.

FIGURE 4 is a typical circuit of a transistor-magnetic oscillator.

FIGURE 7 is a diagram of a hysterisis loop for a square loop core.

FIGURE 8 shows a circuit diagram in which a reference voltage is obtained directly from the main D.C. source.

FIGURE 9 shows a circuit diagram in which the reference voltage is obtained by placing reference diodes in the load line.

Figure 5:
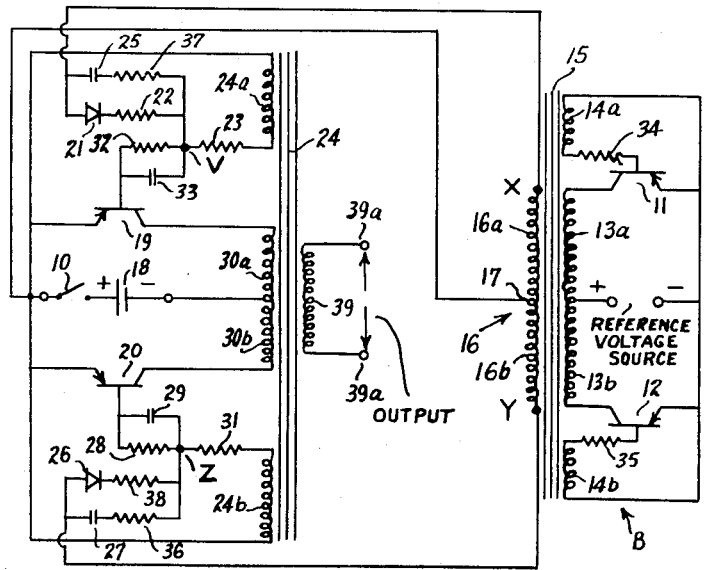
FIGURE 5 is a circuit diagram showing a regulating oscillator coupled to a main or power oscillator but without details of rectifying and filtering circuits or the manner of obtaining a reference voltage.

Referring to the drawings, a typical transistor-magnetic oscillator of the type shown in FIGURE 4 has a D.C. power source 5 and a pair of output terminals 6. A transistor-magnetic oscillator of this type will produce a square wave on the output coil 7 similar to that shown in FIGURE 1.

When this type of transistor-magnetic oscillator is used in D.C.-D.C. converters the rectified output voltage will be directly proportional to the supply voltage unless some means of regulation is applied. The theory behind a novel and efficient method of obtaining a regulated output with oscillators of this type will now be described.

These oscillators require a core with a square hysterisis loop (as shown in FIGURE 7) to operate. This is because the sudden change in the permeability which occurs at saturation is used to trigger the switching of the transistors. It will therefore be evident that the time $t$, as shown in FIGURE 1, for each half wave pulse will be the time taken to drive the core from positive to negative saturation or vice versa. There is a well known relationship between the rate of flux change and the applied voltage, this is $$\frac{d\varphi}{dt} = \text{Rate of Change of Flux} = KV_s \qquad (1)$$

$V_s$ is in this case the supply voltage. Now there is no significant change in $V_s$ during each half cycle so we can write $$\Delta\varphi = K_1 V_s t \qquad (2)$$

and if we take $\Delta\varphi = 2\varphi_s$ (where $\varphi_s$ = Saturation Flux Density) we get $$t = \frac{2\varphi_s}{K_1 V_s} \qquad (3)$$

also the output voltage $V = K_2 V_s$
Therefore $$Vxt = \frac{2K_2}{K_1}\varphi_s \qquad (4)$$

It is evident from Equation 4 that the voltage time integral of the output pulses is independent of the supply voltage and that, if the pulse frequency were maintained constant by introducing a quiescent period $t'$ between each pulse, as shown in FIGURE 2, then the average output voltage would be independent of the supply voltage variations. In the wave form shown in FIGURE 2, $t_R$ is the time for each half wave of a regulated oscillator and is constant, while $t$ will vary inversely with V. For this system of regulation we will need:

(1) A means of introducing the quiescent period $t'$ between each wave pulse.
(2) A means to keep $t_R$ constant.
(3) A means to average out the energy of each wave pulse.

Requirement 1 can be met by using a small transistor magnetic oscillator (which we shall hereafter call the regulating oscillator) to control the switching of the power oscillator. Requirement 2 can be met by operating the regulating oscillator from a reference voltage source and requirement 3 can be met by using a choke in the rectifying and filtering circuit.

There are several ways of coupling the power oscillator A and regulating oscillator B together to ensure satisfactory control of the power oscillator and we will now describe two circuits which have been developed.

We will now describe the operation of the capacitive control circuit shown in FIGURE 5. This circuit only shows the coupling of the power oscillator A and regulating oscillator B and gives no details of the rectifying and filtering circuit or of the manner of obtaining the reference voltage. For the time being it will be assumed that an adequate reference source is available and that the reference voltage is unaffected by variations in load or supply voltage. We will also assume that it is only available when switch 10 is closed. Let us start by considering what happens when we close switch 10, with both the oscillator circuits A and B taken to be dead prior to the closing of the switch 10. The closing of switch 10 applies a positive potential to the emitters of transistors 11 and 12 and causes a slight leakage current to flow from the emitter to collector of each transistor. Now the action of the leakage current in rising from zero towards its stable value causes a slight potential drop across the primary coils 13a and 13b and each of these primary coils induces a potential across the base coils 14a and 14b. Now these coils 14a and 14b are wound in such a manner that the potential across coil 13a makes the base end of coil 14a negative with respect to its emitter end and makes the base end of coil 14b positive with respect to its emitter end. Thus the small potential which initially appears across coil 13a tends to increase the leakage through transistor 11 and decrease the leakage through transistor 12. Similarly the small potential which initially appears across coil 13b tends to increase the leakage through transistor 12 and decrease the leakage through transistor 11. Now if there was exact symmetry between the two halves of the oscillator circuit then there would be no net effect on the leakage of either transistor 11 or 12, the leakage currents would simply rise to their stable value and the unit would not oscillate. However, in practice the leakage through the transistors is never equal and there is a net effect which results in one transistor being rapidly turned fully on while the other is maintained in the off state by a strong positive potential applied to the base terminal. Thus shortly after the closing of switch 10 virtually all the reference voltage will be applied to either coil 13a or 13b. We will now assume that it is transistor 11 which has turned on and hence that the reference voltage is being applied to coil 13a. We will further assume that, prior to closing switch 10, core 15 had a residual flux density indicated by point a of FIGURE 7, and that when transistor 11 has just been turned fully on the flux state of the core 15 is given by point b. The continued application of the reference voltage to coil 13a will result in a further switching of flux into core 15 until eventually the flux density in the core will reach point c, which is the saturation point for core 15, and there will then be a very rapid increase in the current in coil 13a due to the reduced inductance. This increase will persist until transistor 11 saturates at which point the base drive can no longer be maintained. The current in coil 13a then starts to decay and the consequent fly-back voltage causes transistor 11 to switch off rapidly at the same time turning the pole transistor 12 on and commencing the opposite half cycle. Core 15 will then be at point e of the hysterisis loop of FIGURE 7 and continued application of the reference voltage will drive it to point f where core saturation will again occur and quickly lead to saturation of transistor 12. The fly-back voltage resulting from the decay of current in coil 13b will turn transistor 12 off and switch transistor 11 on, bringing core 15 to point h of the hysterisis loop and commencing the next half cycle. The time required to switch the transistors 11 and 12 is very short compared with the time required to change the flux saturation of the core 15 and consequently the output voltage of the secondary coil 16 wound on core 15 will be a square wave. As the centre tap 17 of the secondary coil 16 is connected to the positive input terminal of the D.C. battery 18 the square wave will be centred about this potential i.e. it will be centred about the emitter potential of the power oscillator transistors 19 and 20.

So far we have only considered the response of the regulating oscillator B to the closing of switch 10. The response of the power oscillator will initially be the same i.e. either transistor 19 or 20 will tend to switch on, the other transistor being cut off. However, in this case the base potentials of transistors 19 and 20 are also controlled by the output from the secondary coil 16 of the regulating oscillator B and consequently as soon as transistors 11 and 12 switch to definite states the states of transistors 19 and 20 will be reversed if they are not compatible with those of transistors 11 and 12. This reversal will occur in the following manner. Assume that it is transistor 11 which has been switched to the "on" state and that coil 16 is so wound that, with transistor 11 on end X is the positive end of the coil 16. We will further assume an incompatible condition for the states of transistors 19 and 20, i.e. that 19 is on and 20 is off. Now coil 16a is connected across a circuit of finite impedance, consisting of diode 21, resistance 22, resistance 23 and coil 24a and consequently a current will flow through this circuit whose magnitude will depend on the voltages across coils 16a and 24a and the values of resistors 22 and 23. Transistor 19 will be switched off if its base potential is driven positive with respect to its emitter potential and it can be shown that this will occur if $$\frac{\text{Voltage across coil } 16a}{\text{Voltage across coil } 24a} > \frac{\text{Resistance } 22}{\text{Resistance } 23}$$

When transistor 19 is switched off the fly-back voltage will switch transistor 20 on and thereafter the two oscillators A and B will run synchronised. It will be realized from the above that with correct design the two oscillators A and B will automatically step into synchronisation upon starting.

We will now consider the operation of the converter under steady conditions in order to obtain an appreciation of the role of the various components in the circuit. The object of coupling the two oscillators A and B together is to obtain an output wave from the secondary coil 39 of the form shown in FIGURE 3.

Because of the symmetry of the circuit shown in FIGURE 5 we need only consider the operation of the unit during one-half cycle of steady running. We will commence our analysis at point a of the wave form shown in FIGURE 3 and assume that this corresponds to transistors 11 and 20 in the "on" state and transistors 12 and 19 in the "off" state. In order to achieve satisfactory control the regulating oscillator B should satisfy the following requirements.

Referring to FIGURE 3.

(1) During period ab it should permit unrestrained operation of the power oscillator B apart from the positive drive to the base of transistor 19 to ensure that the two oscillators A and B will only run synchronised.
(2) During period bc it should provide sufficient positive drive to both transistor bases to ensure that transistor 20 is switched off rapidly and that transistor 19 remains off. Both transistors should then be kept in the "off" state until time d is reached.
(3) At time d the regulating oscillator B switches and over period de sufficient negative drive should be applied to the base of transistor 19 to switch it to the "on" state while maintaining the positive drive to the base of transistor 20.

The converter is now operating at point *e* of the wave form, which is the pole point to *a*, and the roles of the half circuits are reversed. We will consider how the circuit shown in FIGURE 5 meets the above requirements.

Over period *ab* end X of the regulating oscillator B secondary coil 16 will be positive and, as discussed earlier, by suitable selection of resistors 22 and 23 condition 1 can be met. During the period *ab* the base end of coil 24a will be positive but at a potential slightly less than that of end X, consequently diode 21 will be forward biased and a small charge will collect on capacitor 25. Also during this period point Y of coil 16 is negative and consequently diode 26 is reverse biased and the operation of the "on" side of the power oscillator A is unaffected by the potential of point Y except for a brief period at *a* when capacitor 27 is being charged to a potential of several volts. Also during period *ab* the voltage drop across resistor 28 caused by the base current results in capacitor 29 being charged to a potential of about 4 or 5 volts. Now just before point *b* is reached core 24 saturates and at *b* transistor 20 saturates. In a normal transistor magnetic oscillator of the type shown in FIGURE 4 saturation of transistor 20 would be followed by decay of current in coil 30b and the resulting fly-back voltage would reverse the states of transistors 20 and 19. However, in the present case the fly-back voltage is very small due to the action of the rectifying and filtering circuit, as will be shown later, and the positive drive from coil 16a to the base of transistor 19 is enough to ensure that it remains in the off state. After period *bc* there is no voltage on coils 24a and 24b and this results in capacitor 25 being charged to approximately half the potential across coil 16a during the period *cd*. At time *c* we desire the base of transistor 20 to be driven positive with respect to the emitter to ensure a quick return to the "off" state. How effectively this is achieved depends on the values of capacitors 29 and 27 and resistances 28, 38 and 31. The polarity of the charge on capacitor 29 is such that it maintains the base of transistor 20 above the potential of point Z. The potential of point Z with respect to the emitter is determined by the charge on capacitor 27 and the potential of point Y. Initially the charge on capacitor 27 is smaller than the potential drop across coil 16b and point Z is negative. However, the charge on capacitor 29 is sufficient to raise the base potential of transistor 20 to that of the emitter and if the time constant of resistances 31 and 38 and capacitor 27 is made small enough compared with the time constant of capacitor 29 and resistance 28 then the base of transistor 20 will quickly be driven positive. In a typical design it might take 3 or 4μ secs. to get a positive potential of 0.5 volt and this has proved to be satisfactory in practice. Condition 3 is satisfied because when the regulating oscillator B switches at time *d* point X goes negative with respect to the emitter potential and the few volts charge which was already on capacitor 25 at time *d* is of such a polarity as to further reduce the potential of point V. The base of transistor 19 is coupled to point V by resistor 32 and capacitor 33 in parallel, and at time *d* there is no charge on capacitor 33 so that the base of transistor 19 is initially switched to the potential of point V thus ensuring that transistor 19 is rapidly switched on. It can be easily seen that over period *de* sufficient positive drive is applied to the base of transistor 20 to ensure that it is held in the "off" state, because at time *d* when the regulating oscillator B switches, the point Z is at emitter potential and capacitor 27 is charged to approximately the potential across coil 16b. Now at time *d* point Y becomes positive with respect to the emitter and the charge on capacitor 27 ensures that point Z is initially dragged to an even greater potential so that at time *e* we have a substantial positive potential applied to the base of transistor 20. Now point *e* is the "pole" point to *a* in the wave-form shown in FIGURE 3 and thereafter the cycle proceeds as described above but with the roles of the half circuits reversed. The average rectified voltage at the terminals 39a of the output coil 39 will be fully regulated in regard to line and load variations. If required there may be a number of output coils 39, all of which will have a regulated voltage. Before finishing the description of FIGURE 5, we would like to point out that resistors 34 and 35 in the base circuit of the regulating oscillator B serve the purpose of limiting the saturation current of transistors 11 and 12 and the corresponding components in the power oscillator A are the resistors 32 and 23 for transistor 19 and 28 and 31 for transistor 20. In this case the control requirements necessitate division of the base current control resistors. The resistors 36 and 37 are for the purpose of limiting the power drawn from the regulating oscillator B to the capacitors 25 and 27. The resistor 38 performs the same function as the resistor 22 in the opposite half of the oscillator.

Figure 6:
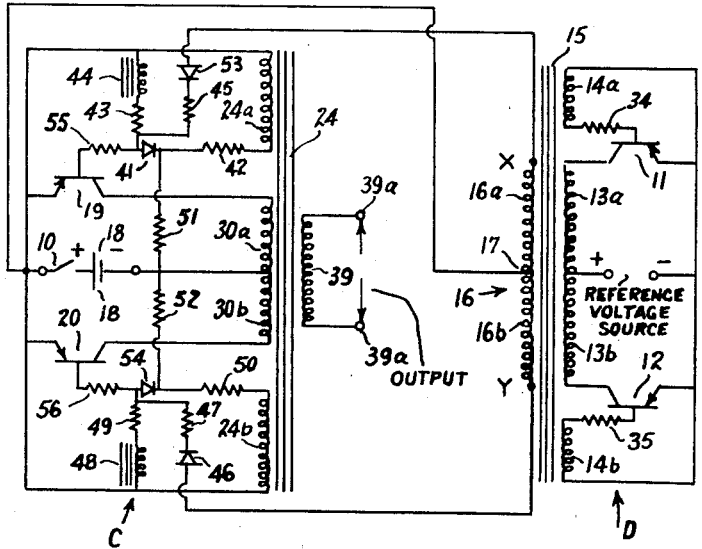
FIGURE 6 is a circuit diagram similar to FIGURE 5 but showing in addition means whereby automatic synchronisation between the main or power oscillator and the regulating oscillator is obtained.

Another inductive control circuit which has been developed is shown in FIGURE 6. In this circuit similar elements performing similar functions as in the circuit shown in FIGURE 5, have been given the same numerals. The difference between the circuits of FIGURES 5 and 6 is mainly in the coupling between the power oscillator C and the regulating oscillator D and is confined to the components concerned with transient effects. The D.C. coupling between the two oscillators C and D is in both cases through a diode and resistor. Consequently, as we consider the portion *ab* of the wave-form shown in FIGURE 3 to be a steady state region, it is evident that the circuit of FIGURE 6 will provide automatic synchronisation between the two oscillators if it is correctly designed. The following description will show how the circuit provides control.

The control requirements for the inductive control circuit of FIGURE 6 are the same as those given for the capacitive control circuit of FIGURE 5 and we will also make the same assumptions with regard to the transistor states. Commencing at point *a* of the wave-form we have end X of coil 16a positive with respect to the emitter of transistors 19 and 20. As transistor 19 is assumed to be in the "off" state the base end of coil 24a will be positive but owing to the diode 41 coil 24a will be unable to drive current through the loop comprising resistors 42 and 43 and choke 44. Coil 16a however, will be able to drive current through the loop comprising resistors 45 and 43 and choke 44. With point Y negative diode 46 will be reverse biased and no current will flow through resistor 47. Coil 24b will drive current through the main emitter base loop and also through the minor loop comprising choke 48 and resistors 49 and 50. When point *b* of the wave-form is reached the potentials are removed from coils 24a and 24b and the base end of choke 48 will go positive with respect to the emitter in order to maintain the choke current and will thus ensure that transistor 20 is rapidly switched to the "off" state. Removal of the potential from coil 24a has little effect on the base control circuit of transistor 19. When point *d* of the wave-form is reached and the regulating oscillator D switches, the drive for current through choke 44 is removed. This drives the base end of choke 44 negative with respect to the emitter potential and ensures rapid turn on of the transistor 19 and commencement of the next half cycle. Resistors 51 and 52 have been added to assist starting the power oscillator. To complete the two halves of the power oscillator C the diode 53 is similar to the diode 46, the diode 54 is similar to the diode 41 and the resistors 50 and 56 together with resistors 42 and 55 comprise the base circuit resistance for the power oscillator C.

As the power required by the regulating oscillators B and D is relatively small it is easy to provide a reference voltage for its operation and the manner in which it is obtained is not really relevant to this invention. However, two methods by which it may be obtained will now be described.

FIGURE 8 shows a circuit in which the reference voltage is obtained directly from the main D.C. source. Resistance 57 and reference diodes 58 are connected in series across the supply battery 59. By matching the value of resistor 57 to the characteristics of reference diodes 58 and the expected voltage variations in battery 59 a satisfactory voltage is available across the reference diodes 58. The capacitor 60 is used for smoothing purposes.

FIGURE 9 shows a circuit in which the reference voltage is obtained by placing the reference diodes 58 in the load line. As before a smoothing capacitor 60 is used across the diodes 58.

FIGURE 9 shows in addition to a reference source a smoothing and filtering circuit which has been found to give satisfactory performance. The output coil or coils 39 is connected across a bridge rectifier comprised of rectifier diodes 61. The positive terminal of the rectifier bridge is connected to choke 62 and the negative terminal to one plate of smoothing capacitor 63, the other plate of capacitor 63 being connected to the load end of the choke 62.

The filter circuit shown in FIGURE 9 effects the normal operation of the power oscillators A and C so that even with the regulating oscillators B and D disconnected from the power oscillators an output wave-form similar to that shown in FIGURE 3 is obtained as the output of coil 39 instead of the normal wave of a transistor magnetic oscillator, shown in FIGURE 1. This failure to operate normally can be explained as follows:

Assume that, over the period $ab$ of the wave-form shown in FIGURE 3, transistor 20 is in the "on" state and transistor 19 is in the "off" state. On reaching point $b$ transistor 20 switches off and normally the resulting fly-back voltage would switch transistor 19 on. However, in this case when transistor 20 switches, choke 62 is carrying maximum current and the rectifier end of the choke is driven negative, biasing all four rectifier diodes 61 in the forward direction. Assuming all the diodes to have the same characteristics then the load current $I$ carried by the choke will divided evenly between the two arms of the rectifier bridge. Now it can be shown that in these circumstances the rectifier circuit is equivalent to a resistor $r$ across the secondary coil 39, where $r$ is the dynamic resistance of the diodes 61 when carrying a current of $I/2$. At point $c$ the current $I$ is high and consequently $r$ is small. This means that the decay of the magnetic field is very slow and because of the large ratio of secondary to base turns the fly-back voltage on the base coil is far too low to permit transistor 19 to switch on. However $i$ will decay nearly linearly with time, and $r$ is approximately inversely proportional to $I$ so that eventually the rectifier circuit represents a substantial load resistance and transistor 19 can then switch to the "on" state.

The above described invention particularly illustrated in FIGURES 5 and 6 will produce any desired output D.C. voltage or a number of D.C. output voltages when operated from a D.C. power supply. These output voltages will be regulated, both in regard to line and load variations to a high degree. In addition, the output voltages can be made insensitive to variations in ambient temperatures in the design stage by selection of suitable reference diodes. A further advantage is that this regulation can be achieved without recourse to large power losses in the unit resulting in a high overall efficiency for the converter.

What I claim is:

1. A power supply system of the D.C.-D.C. converter type employing a square wave transistor-magnetic power oscillator, a D.C. power supply connected to said power oscillator, and an output coil receiving a regulated output voltage from said power oscalltor, means to regulate the output voltage of the said power oscillator, said means comprising a regulating square wave transistor-magnetic oscillator, means to rectify and filter the output wave, said means comprising a rectifier circuit connected to an inductive capacitive filter, means to couple the said regulating oscillator to said power oscillator, a control reference voltage source applied to said regulating oscillator, the said control reference voltage maintaining a constant switching cycle in the regulating oscillator, the switching cycle of the regulating oscillator in turn controlling the switching cycle of the power oscillator independently of the power supply to the power oscillator.

2. A power supply system of the D.C.-D.C. converter type employing a square wave transistor-magnetic power oscillator, a D.C. power supply connected to said power oscillator and an output coil receiving a regulated output voltage from said power oscillator, means to introduce a quiescent period between each pulse wave in said power oscillator to regulate the output voltage to said output coil, said means comprising a regulating square wave transistor-magnetic oscillator, means to rectify and filter the output wave, said means comprising a rectifier circuit connected to an inductive capacitive filter, means to couple the said regulating oscillator to said power oscillator, a control reference voltage source applied to said regulating oscillator, the said control reference voltage maintaining a constant switching cycle in the regulating oscillator, the switching cycle of the regulating oscillator in turn controlling the switching cycle of the power oscillator independently of the power supply to the power oscillator.

3. A power supply system as set forth in claim 2, in which both the power oscillator and the regulating oscillator each have a transformer having primary and base coils and an output coil and a pair of transistors in each of said oscillators, with the base of the said transistors being connected to one side of the said base coils and the emitters of the transistors being connected to the said primary coils.

4. A power supply system as set forth in claim 3, in which the pair of transistors in the regulating oscillator are powered by a controlled reference voltage supply, the said controlled reference voltage supply setting up a constant switching cycle and in which the pair of transistors in the power oscillator are switched on and off by impulses transmitted from the transistors in the regulating oscillator.

5. A power supply system as set forth in claim 2, in which the means to introduce a quiescent period between each pulse wave in the system comprises a transformer in which the time allowed to change the flux saturation of the core of the transformer is controlled by the switching cycle of the transistors in the regulating oscillator.

6. A power supply system as set forth in claim 3, in which the circuits between the ends of the output coil of the transformer in the regulating oscillator and the base of the pair of transistors in the power oscillator is of finite impedance and include a diode and resistances to control the magnitude and polarity of the potential applied to the base of said transistors.

7. A power supply system as set forth in claim 5, in which the quiescent period in the switching cycle controlling the switching on and off of the transistors in the power oscillator effects the switching off of one transistor and holds the other transistor off for a constant period before the switching of the said transistors is reversed.

8. A power supply system as set forth in claim 6, in which the current circuits between the ends of the output coil of the transformer in the regulating oscillator and the base of the transistors in the power oscillator include a choke controlling together with the said diode and said power oscillator base coils the magnitude and polarity of the potential applied to the base of the power oscillator transistors on switching of the transistors in the power oscillator, and on reversal of switching of the transistors in the regulating oscillators.

9. A power supply system as set forth in claim 2, in which the control reference voltage source includes a resistance and a reference diode connected in series across the D.C. supply to the regulating oscillator.

10. A power supply system as set forth in claim 2, in which the control reference voltage source includes a reference diode in the load line of the power oscillator.

11. A power supply system as set forth in claim 2, in which the output coil of the power oscillator is connected across a bridge rectifier.

12. A power supply system as set forth in claim 11, in which the bridge rectifier is comprised of rectifier diodes.

References Cited in the file of this patent

UNITED STATES PATENTS

| | | |
|---|---|---|
| 2,783,384 | Bright et al. | Feb. 26, 1957 |
| 2,837,651 | Schultz | June 3, 1958 |
| 2,849,614 | Royer et al. | Aug. 26, 1958 |
| 2,875,351 | Collins | Feb. 24, 1959 |
| 2,916,687 | Cronin | Dec. 8, 1959 |